United States Patent [19]

Wong et al.

[11] 4,240,652
[45] Dec. 23, 1980

[54] LIGHTWEIGHT DRILL ROD

[75] Inventors: Lip F. Wong; Benton A. Whiteman, both of Richmond, Va.

[73] Assignee: Reynolds Metals Company, Richmond, Va.

[21] Appl. No.: 42,015

[22] Filed: May 24, 1979

[51] Int. Cl.³ .............................................. F16L 15/00
[52] U.S. Cl. ...................................... 285/91; 285/333
[58] Field of Search ..................... 285/91, 90, 92, 334, 285/333; 403/320, 378, 379

[56] References Cited

U.S. PATENT DOCUMENTS

| | | | |
|---|---|---|---|
| 1,287,431 | 12/1918 | Quarles et al. | 151/24 |
| 1,344,774 | 6/1920 | Stafford | 285/90 |
| 2,073,093 | 3/1937 | Brantly | 285/333 X |
| 2,992,021 | 7/1961 | Nay | 285/334 |
| 3,126,214 | 3/1964 | Wong et al. | 285/333 X |
| 3,667,784 | 6/1972 | Hokanson et al. | 285/334 X |

FOREIGN PATENT DOCUMENTS 1062649  8/1959  Fed. Rep. of Germany .......... 403/320
892568  3/1962  United Kingdom ...................... 285/90

*Primary Examiner*—Thomas F. Callaghan
*Attorney, Agent, or Firm*—Glenn, Lyne, Girard & McDonald

[57] ABSTRACT

Described is an improved lightweight section of drill rod which is adapted to be coupled with like sections of drill rod in making up a drill string for use with oil well drilling rigs or the like. This drill rod comprises a length of hollow cylindrical aluminum pipe with steel tool joints threaded into the ends thereof. Dowel pins are used to permanently and securely attach the tool joints to the pipe ends.

1 Claim, 5 Drawing Figures

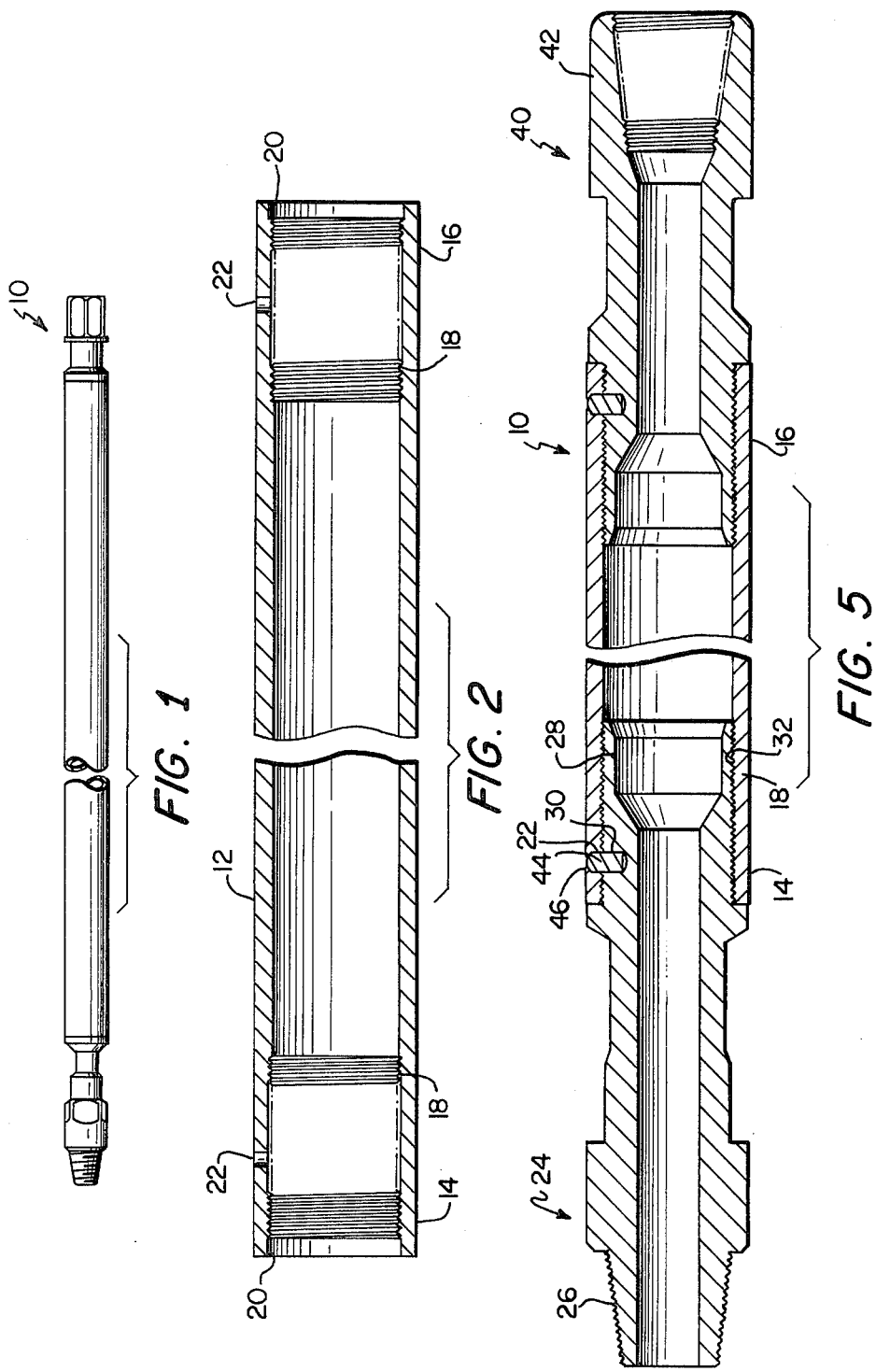

LIGHTWEIGHT DRILL ROD

This invention relates to drill rod used in earth boring operations such as oil well drilling. And it relates in particular to lightweight drill rod sections of the type comprising a length of hollow cylindrical aluminum pipe with steel tool joints threaded into the ends thereof.

In drilling relatively deep wells, such as those which reach a depth of several hundred to several thousand feet deep, a plurality of drill rod sections, which are typically about twenty-five feet long more or less, are coupled together in series to form a drill string. The connection between these drill rod sections is made by fasteners, usually threaded fasteners, known as tool joints.

To bore the well, the drill string carries a drill bit at its lower end. As the well is bored deeper and deeper by the rotating bit, the drill string is correspondingly lengthened by the addition of drill rod sections at the well top.

In accordance with convention, each drill rod section is made hollow so that the drill string can serve as a conduit for drilling fluid, such as compressed air, which is discharged through the drill bit at the bottom of the well. This drilling fluid picks up cuttings from the drill bit and carries them upwardly to the well top on the outside of the drill string. Compressed air, when used as the drilling fluid, can also be used to operate the drill bit, as in percussion drilling; or the drill bit can be operated directly by drill string rotation.

One limitation on the drilling of relatively deep wells is the drill string weight, which of course becomes greater and greater as the well depth is increased. Historically, drill rod sections have been made of steel; but with the deeper wells now being drilled, the heavier drill strings can impose fatiguing loads on the component drill rod sections and on the equipment used to rotate and raise and lower the drill string.

Accordingly, lighter weight drill rod sections are now being considered, such as drill rod sections made of aluminum and its alloys. Aluminum has proven to be an ideal material for this use, except that it has been generally thought to be impractical for making tool joints, particularly tool joints with male and female threaded ends. Aluminum threads cannot generally carry the shear loads that steel threads can, nor can they hold up as well under the abrasive action of dirt and grit, which commonly finds its way onto the tool joints in the course of making and breaking drill rod connections at the well site. Also, aluminum oxide formation can sometimes cause a threaded aluminum connection to seize. Thus, steel has generally remained as the accepted material for making tool joints.

Consequently, a problem that required solving was how to go about attaching a steel tool joint to a length of aluminum pipe to provide a mechanically sound section of drill rod. A welded attachment would be ideal, but aluminum is not readily weldable to steel.

One approach to the problem has been simply to attach the steel tool joint to the aluminum pipe with a threaded connection. Going a step further, U.S. Pat. No. 3,667,784 to Hokanson et al shows such a connection mating torque shoulders and the use of a thread locking compound.

It is believed, however, that the prior approaches are not entirely satisfactory in terms of their ability to permanently and securely attach a steel tool joint to a length of aluminum pipe.

It was against this background that this invention was made.

SUMMARY

This invention provides an improved lightweight section of drill rod which is adapted to be coupled to like sections of drill rod in making up a drill string for use with oil well drilling rigs or the like.

More particularly, the improvement of this invention concerns the type of drill rod section which comprises a length of hollow cylindrical pipe made of aluminum or an aluminum alloy, where the pipe has an internally threaded end, and further comprises a hollow steel tool joint having an externally threaded male end which is disposed in mating engagement within such internally threaded pipe end.

Specifically, this invention is directed to the improvement wherein the said externally threaded male tool joint end is provided with an outwardly open blind hole, and the said internally threaded female pipe end is provided with a hole through one sidewall of the pipe, such that when the male tool joint end is matingly engaged in the female pipe end, the two holes are in aligned relationship; and wherein a dowel pin is snugly disposed within the two aligned holes, and material adjacent the exterior opening of the hole through the one sidewall of the pipe is peened over this dowel pin, whereby the steel tool joint is permanently and securely attached to the length of aluminum pipe.

BRIEF DESCRIPTION OF THE DRAWINGS

In the appended drawings:

FIG. 1 is a side view of the presently preferred configuration for the drill rod section of this invention;

FIG. 2 is a sectional side view, with a portion removed, of a length of hollow cylindrical pipe used in making the drill rod section shown in FIG. 1;

FIG. 5 is a sectional side view, with a portion removed, which illustrates the presently preferred embodiment of the drill rod section of this invention in detail.

DESCRIPTION OF THE PRESENTLY PREFERRED EMBODIMENT

Figure 3:
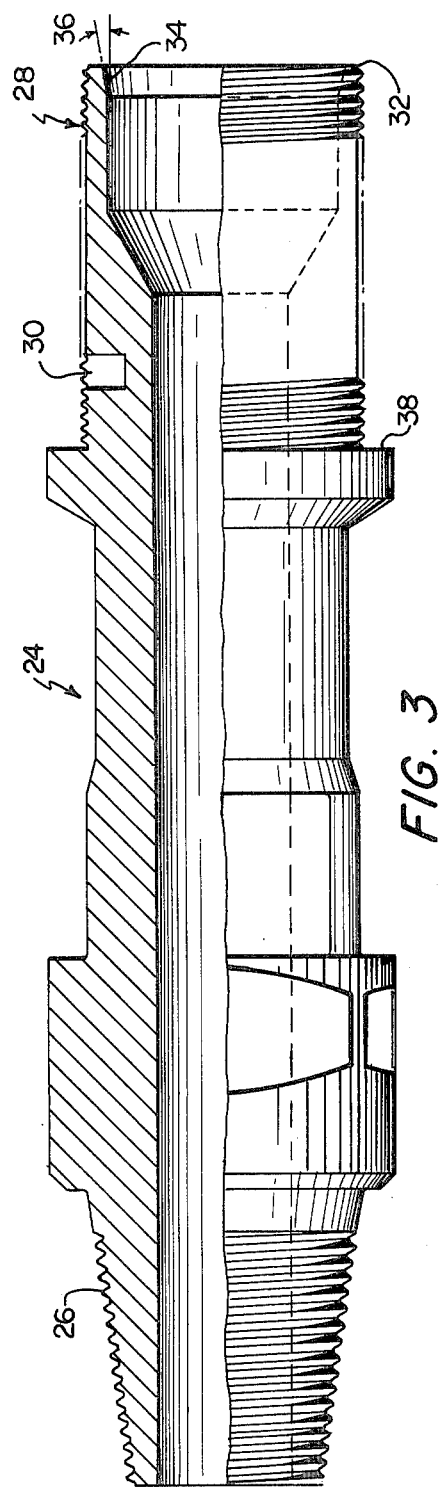
FIG. 3 is a side view, with a section removed, showing a hollow tool joint to be attached to one end of the pipe shown in FIG. 2.

FIG. 1 illustrates a drill rod section 10 which is the presently preferred configuration for the drill rod section provided by this invention. In this configuration, the drill rod section 10 is particularly adapted for use in combination with a carousel type drilling rig and drill rod storage apparatus, such as the apparatus described in U.S. Pat. No. 3,493,061 to L. Gyongyos. When fabricated in a 4.5 inch O.D., 25 foot length, the drill rod section 10 can be readily adapted for use with the T-4 Drillmaster type carousel drilling rig and drill rod storage apparatus manufactured by the Ingersoll-Rand Company.

FIG. 2 illustrates a length of hollow cylindrical pipe 12 for constructing the drill rod section 10 in accordance with this invention. The pipe 12 is made of aluminum or an aluminum alloy, and preferably it is an extruded part made of 2014 aluminum alloy in a T6 temper. (The nominal composition of the 2014 alloy, in percentages by weight, is 0.50 to 1.2% Si, 3.9 to 5.0% Cu, 0.40 to 1.2% Mn, 0.2 to 0.8% Mg, no more than 0.7% Fe, 0.10% Cr, 0.25% Zn, 0.20% total Zr and Ti, 0.15% Ti, 0.05 each for others and 0.15 total for others, balance aluminum.)

As shown in the figure, the pipe 12 has internally threaded female ends 14 and 16. For a 4.5 inch O.D. pipe 12, the preferred wall thickness of the pipe 12 is 0.500 inches, and the preferred threads 18 are ASA 60° stub threads, with 6 threads per inch and a thread height of 0.755 inches, the minor inside diameter of the threaded ends being about 3.578 inches. FIG. 2 also shows the presently preferred practice whereby the pipe ends 14 and 16 are each internally relieved at their respective extreme end portions 20 by an amount corresponding approximately to the height of the threads 18 therein to provide a torque shoulder capable of carrying a compressive load imposed by torquing down the tool joints. (For a 4.5 inch O.D. pipe 12, the pipe ends 14 and 16 are preferably each relieved to an internal diameter of about 3.750 inches for a depth of about 0.5 inches measured from the pipe end. And the pipe ends 14 and 16 are preferably threaded back to a depth of about 5.5 inches measured from the pipe end.)

And as further shown in FIG. 2, each pipe end 14 and 16 is provided with a hole 22 which runs through one sidewall of the pipe 12.

FIG. 3 illustrates a hollow tool joint 24 with a male connection pin 26. The tool joint 24 is made of steel, preferably to the SAE 4150 specification with a Brinell Hardness number of about 293 to 321. For a 4.5 inch O.D. pipe 12, the connection pin 26 is preferably a 3.5 inch API Reg. Rotary Shouldered connection pin.

In the figure, the tool joint 24 has an externally threaded male end 28 provided with an outwardly open blind hole 30. (To go along with the preferred dimensions given for the internal threading of the pipe 12 for a 4.5 inch O.D., the tool joint end 28 should be about 5 inches in length and have an outside major thread diameter of about 3.729 inches. And the external threads 32 should be ASA 60° stub threads with 6 threads per inch and a 0.0755 inch thread height to correspond with the threads 18 in the pipe 12. The tool joint 24 will preferably have a 1¾ inch I.D. hollow bore which increases to about 3 inches I.D. toward the threaded end 28 for transition with the inner diameter of the pipe 12 and to provide a degree of compressive resilience to the threaded end 28. To avoid failure of the extreme end threads 32, it has been found to be helpful to provide the extreme end portion 34 with an internal chamfer 36 of about 18°.)

Preferably, the tool joint 24 also has an annular shoulder 38, as shown, which mates with the extreme end portion 20 of the pipe end 14 when the tool joint end 28 is matingly engaged in the pipe end 14, such that when the tool joint 24 is torqued down into the pipe end 14, the extreme end portion 20 thereof carries a compressive load and helps secure the connection.

Figure 4:
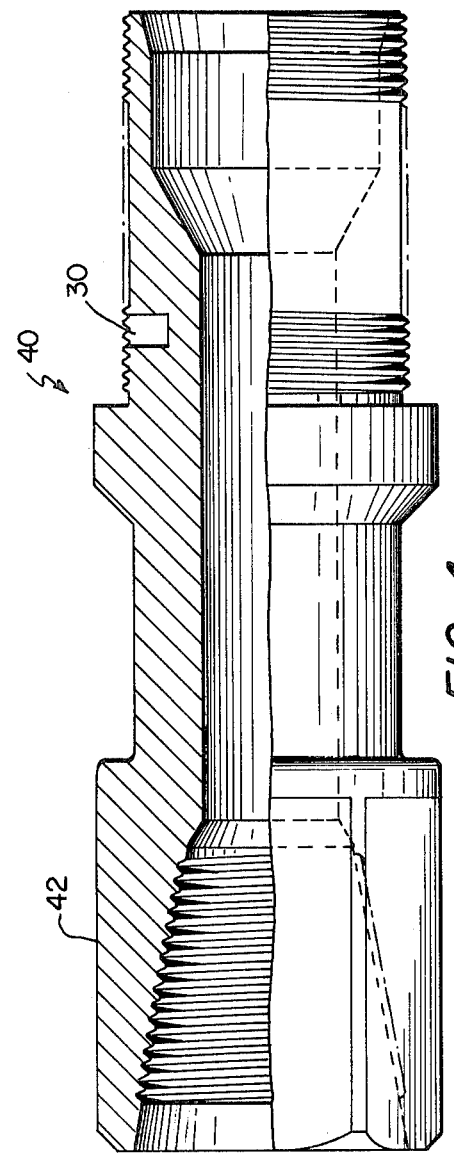
FIG. 4 is a side view, with a section removed, showing a hollow tool joint to be attached to the other end of the pipe shown in FIG. 2.

FIG. 4 shows a second tool joint 40, which is to be attached to the pipe end 16. The tool joint 40 is similar to the tool joint 24, except that it has a female connection box 42 in lieu of the male connection pin 26.

FIG. 5 shows the assembled drill rod section 10 in detail. As shown, the tool joint 24 is attached to the pipe 12 with the male tool joint end 28 disposed in mating engagement within the internally threaded pipe end 14.

The hole 22 in the pipe end 14 is now in aligned relationship with the blind hole 30 in the male tool joint end 28, and a dowel pin 44 is snugly disposed within the two holes 22 and 30. The two holes 22 and 30 can be drilled separately, but to be sure of proper alignment, it is preferred that they be drilled as one after the tool joint 24 is torqued into the pipe 12. As the figure also shows, material 46 adjacent the exterior opening of the hole 22 in the pipe end 14 is peened over the dowel pin 44. Preferably, the pin 44 has an interference fit in the holes 22 and 30 and is installed with a thread locking compound, such as Loctite 35 made by the Loctite Corporation. A thread locking compound is also preferably used in securing the tool joint threads 32 within the pipe end threads 18.

As an example of the preferred assembly practice for a 4.5 inch O.D. pipe 12, the tool joint threads 32 and the pipe end threads 18 are first jet sprayed with solvent to eliminate oil, dirt and grease. The threads 32 and 18 are then sprayed with a primer, such as Locquic Grde T made by the Loctite Corporation, and allowed to dry 3 to 5 minutes. The thread locking compound is then applied to the threads 32 and 18, and the tool joint 24 is screwed in and out of the pipe end 14 to ensure even distribution of the locking compound. Within five minutes of the application of the locking compound, the tool joint 24 is screwed into the pipe end 14 and torqued down to about 8000 ft-lbs. The holes 22 and 30 are then drilled and the dowel pin 44 is installed as noted. The tool joint 40 is attached to the pipe end 16 in a similar manner.

Where a 4.5 inch O.D. pipe 12 is used, the preferred dowel pin size is 5/8 inch O.D.×1 inch long, and the holes 22 and 30 are drilled to a 39/64 inch diameter. The dowel pin 44 is sunk below the outer surface of the pipe 12, preferably by about 3/64 inch to allow for peening.

Having now described the presently preferred embodiment of this invention, an appreciation for its advantages can be facilitated by reference to the following Example.

EXAMPLE

Drill rod sections were made up in accordance with this invention for use with the T-4 Drillmaster carousel drilling rig and drill rod storage apparatus manufactured by the Ingersoll-Rand Company. This drilling rig and drill rod storage apparatus was originally designed for use with special steel drill rod sections which measure 25 feet long and have a 4.5 inch O.D. These steel drill rod sections typically weigh about 429 lbs. each and are rated for drilling wells up to 2,000 feet in depth.

The drill rod sections made up in accordance with this invention were made to the same size and shape as the original steel drill rod sections, and thus had the basic configuration illustrated in FIG. 1. The component parts were all within the previously stated preferred dimensions for a 4.5 inch O.D. pipe size, and assembly followed the previously stated preferred practices.

These lightweight drill rod sections weighed only 256 lbs. each and were successfully used in drilling two 3,500 feet deep wells. The rated well depth capacity for these drill rod sections was 4,000 feet.

While this invention has been described primarily by reference to one of its presently preferred embodiments, such reference is to be construed as being merely exemplary in nature; and it will be understood that innumerable modifications of the presently preferred embodiment are possible which nevertheless are within the scope of this invention, which is intended to be measured and limited only by the following claims.

What is claimed is:

1. In an improved lightweight section of drill rod, which is adapted to be coupled with like sections of drill rod in making up a drill string for use with oil well drilling rigs or the like, said section of drill rod being of the type which comprises a length of hollow cylindrical pipe made of aluminum or an aluminum alloy, where said pipe has an internally threaded female end, and a hollow steel tool joint attached to the said end of said pipe, said tool joint having an externally threaded male end which is disposed in mating engagement within the said internally threaded female end of said pipe; the improvement wherein the said externally threaded male tool joint end is provided with an outwardly open blind hole, and the said internally threaded female pipe end is provided with a hole which runs through one sidewall of said pipe, such that when said male tool joint end is matingly engaged in the said associated internally threaded female pipe end, the two said holes are in aligned relationship, and a dowel pin is snugly disposed within the two said holes, and material adjacent the exterior opening of the said hole in the said internally threaded female pipe end is peened over said dowel pin, whereby the said tool joint is permanently and securely attached to said pipe;

said internally threaded pipe end being internally relieved at its extreme end portion by an amount corresponding approximately to the height of the threads therein, and the said tool joint having an annular shoulder which mates with the said extreme end portion of said pipe when said pipe and said tool joint are matingly engaged, and said tool joint being torqued down into the said pipe end such that the said extreme end portion of said pipe carries a compressive load;

the internal threads in said pipe end and the external threads of said tool joint end being ASA 60° stub threads and a thread locking compound having been applied to said internal and external threads and to said dowel pin;

said pipe being an extrusion made of 2014 aluminum alloy in T6 temper, and said tool joint being made of SAE 4150 steel with a Brinell hardness in the range of 293 to 321;

said section of drill rod being of the type adapted for use in combination with a carousel type drilling rig and drill rod storage apparatus; and said male tool joint end having a hollow bore which increases in inside diameter toward its said externally threaded male end, and the extreme end portion of said externally threaded male tool joint end being provided with an internal chamfer of about 18°.

* * * * *

Disclaimer 4,240,652.—*Lip F. Wong*, and *Benton A. Whiteman*, Richmond, Va. LIGHT-WEIGHT DRILL ROD. Patent dated Dec. 23, 1980. Disclaimer filed Dec. 8, 1980, by the assignee, *Reynolds Metals Company*.

Hereby enters this disclaimer to claim 1 of said patent.

[*Official Gazette February 17, 1981.*]